(12) United States Patent
Hebert

(10) Patent No.: US 6,858,090 B2
(45) Date of Patent: Feb. 22, 2005

(54) CLOSED LOOP CLEANING SYSTEM

(76) Inventor: Shirley A. Hebert, 6568 S. Racine Cir., Suite 2000, Englewood, CO (US) 80111

( * ) Notice: Subject to any disclaimer, the term of this patent is extended or adjusted under 35 U.S.C. 154(b) by 216 days.

(21) Appl. No.: 10/312,658

(22) PCT Filed: Jun. 29, 2001

(86) PCT No.: PCT/US01/20862
§ 371 (c)(1),
(2), (4) Date: Dec. 27, 2002

(87) PCT Pub. No.: WO02/02249
PCT Pub. Date: Jan. 10, 2002

(65) Prior Publication Data
US 2003/0209257 A1 Nov. 13, 2003

Related U.S. Application Data
(60) Provisional application No. 60/215,498, filed on Jun. 30, 2000.

(51) Int. Cl.⁷ .................................................. B08B 3/02
(52) U.S. Cl. ...................... 134/13; 134/22.12; 134/40; 134/168 R; 134/111; 134/169 R
(58) Field of Search ........................... 134/12, 13, 22.1, 134/22.12, 22.14, 22.18, 22.19, 34, 40, 111, 166 R, 168 R, 169 R

(56) References Cited

U.S. PATENT DOCUMENTS

| | | | | |
|---|---|---|---|---|
| 1,982,592 A | * | 11/1934 | Dobyne | 451/456 |
| 3,046,163 A | * | 7/1962 | Kearney et al. | 134/11 |
| 3,619,409 A | * | 11/1971 | Stokeld, Jr. | 208/95 |
| 4,357,175 A | * | 11/1982 | Buffington et al. | 134/10 |
| 4,770,196 A | * | 9/1988 | Osswald | 134/104.4 |
| 5,085,242 A | * | 2/1992 | Ripley et al. | 137/13 |
| 5,085,710 A | | 2/1992 | Goss | 134/22.14 |
| 5,356,482 A | | 10/1994 | Mehta et al. | 134/22.1 |
| 5,389,156 A | * | 2/1995 | Mehta et al. | 134/10 |
| 5,397,397 A | * | 3/1995 | Awad | 134/1 |
| 5,413,129 A | * | 5/1995 | Shenoi | 134/65 |
| 5,425,183 A | * | 6/1995 | Taylor | 34/73 |
| 5,425,814 A | * | 6/1995 | Krajicek et al. | 134/22.1 |
| 5,470,458 A | * | 11/1995 | Ripley et al. | 208/370 |
| 5,531,188 A | * | 7/1996 | Tomasulo | 122/379 |
| 5,611,869 A | * | 3/1997 | Hart | 134/22.19 |
| 5,762,719 A | | 6/1998 | D'Muhala et al. | 134/42 |
| 6,021,793 A | | 2/2000 | Moulder | 134/167 R |
| 6,120,680 A | | 9/2000 | Campbell | 208/428 |
| 6,168,708 B1 | * | 1/2001 | Burbridge et al. | 208/27 |
| 6,462,011 B1 | * | 10/2002 | Collins et al. | 510/437 |
| 6,773,554 B1 | * | 8/2004 | Moore, Jr. | 203/87 |

FOREIGN PATENT DOCUMENTS

| | | | |
|---|---|---|---|
| DE | 195 17 880 | * | 11/1996 |
| JP | 7-308501 | * | 11/1995 |
| WO | WO 93/15166 | * | 8/1994 |

* cited by examiner

Primary Examiner—Frankie L. Stinson
(74) Attorney, Agent, or Firm—Kyle W. Rost

(57) ABSTRACT

Railroad tank cars that have contained petroleum products are cleaned of asphalt residues by a closed cleaning system. An initial spray of terpene-based solvent is followed by a water rinse. The solvent extracts hydrocarbons from the asphalt residue. The solvent and hydrocarbon are separated by filtration, stratification, and distillation, allowing reuse of clean solvent and sale of marketable oil products. The rinse water is cleaned by filtration and evaporation of solvent residues, allowing reuse of the water. The asphalt solids such as residual inorganics are removed by filtration as a dry product suited for disposal in a landfill.

17 Claims, 1 Drawing Sheet

CLOSED LOOP CLEANING SYSTEM

CROSS-REFERENCE TO RELATED APPLICATIONS

This application is a 371 of international PCT/US01/20862, of international filing date Jun. 30, 2000, copending; which is a non-provisional of provisional 60/215,498, filed Jun. 30, 2000, now expired.

TECHNICAL FIELD

The invention generally relates to fluid handling and to cleaning and liquid contact with solids. The invention also relates to fluid sprinkling, spraying and diffusing. More specifically, the invention relates to method and apparatus for non-entry cleaning of tanks and railroad tank cars, with substantially full recovery and reuse of cleaning solution and of the commodity that has been cleaned from the tank.

BACKGROUND ART

Railroad tank cars haul numerous commodities that are difficult to clean from the railroad car. These include, for example, oil and asphalt. Traditional cleaning methods require that a technician enter the tank while equipped with personal protective equipment. The technician cleans the tank by physical scraping using a pick and shovel. This method generates waste material consisting of the removed remnants of the commodity. The method also is extremely time consuming and expensive, both in cost of cleaning and in loss of use. Typically, cleaning asphalt from a tank car takes three to four days.

Automated systems can eliminate the need for a technician to enter the tank in some cases. For example, some commodities can be removed by scrubbing action of a spray consisting of a solvent such as water or common cleaning solutions. U.S. Pat. No. 6,021,793 to Moulder shows an example of an automated high pressure fluid spray system for cleaning tank cars. While the mechanisms of the spray device are the primary subject matter of Moulder's invention, the state-of-the-art in chemical solvents and washes are listed to be water, diesel fuel, terpine hydrocarbon, and caustic

TECHNICAL FIELD

The invention generally relates to fluid handling and to cleaning and liquid contact with solids. The invention also relates to fluid sprinkling, spraying and diffusing. More specifically, the invention relates to method and apparatus for non-entry cleaning of tanks and railroad tank cars, with substantially full recovery and reuse of cleaning solution and of the commodity that has been cleaned from the tank.

BACKGROUND ART

Railroad tank cars haul numerous commodities that are difficult to clean from the railroad car. These include, for example, oil and asphalt Traditional cleaning methods require that a technician enter the tank while equipped with personal protective equipment. The technician cleans the tank by physical scraping using a pick and shovel This method generates waste material consisting of the removed remnants of the commodity. The method also is extremely time consuming and expensive, both in cost of cleaning and in loss of use. Typically, cleaning asphalt from a tank car takes three to four days.

Automated systems can eliminate the need for a technician to enter the tank in some cases. For example, some commodities can be removed by scrubbing action of a spray consisting of a solvent such as water or common cleaning solutions. U.S. Pat. No. 6,021,793 to Moulder shows an example of an automated high pressure fluid spray system for cleaning tank cars. While the mechanisms of the spray device are the primary subject matter of Moulder's invention, the state-of-the-art in chemical solvents and washes are listed to be water, diesel fuel, terpine hydrocarbon, and caustic soda. However, using solvents and solutions can compound the problem of waste disposal by increasing the volume of waste for disposal. In addition, an automated washing system offers little chance of recovering the commodity for reuse.

Various other solvents and cleaning compounds have been developed for treating vessels in which petroleum products have been processed, stored, or transported. U.S. Pat. No. 5,356,482 to Mehta et al. discloses a process for cleaning chemical process tanks and petroleum tanks, primarily by removing benzene, so that workers can enter the ranks for further cleaning and maintenance. The residual contents of the tank must be tested to identify the chosen contaminant. Then, a suitable extractant and a surfactant are applied to the vessel by vaporizing them and applying as a fog or in conjunction with steam. Possible extractants are limonene, various terpenes (dipentenes, cinenes, cajeputenes, diamylenes, oils of bergamot, geranium, citronella, dill, and caraway); and related terpenes such as hermiterpenes (isoprenes), sesquiterpenes (caryophyllenes), diterpenes, and polyterpenes. U.S. Pat. No. 5,611,869 to Hart proposes to clean refinery vessels by using an aqueous solution of alkylphenol-formaldehyde resin alkoxylate, a poly(ethylene glycol)dialkyl ester, and a solvent of $C_1$ to $C_8$ alcohol, glycol, and glycol ether. Such discoveries of improved solvents are beneficial for better cleaning sludges from storage tanks and rail cars, but the proposed cleaning methods offer no solution to the ever increasing volume of waste product sent to landfill.

Several systems have been proposed for treating sludges and recovering at least some of the products of the cleaning in characterized batches, such as aqueous product and hydrocarbon product U.S. Pat. No. 5,085,710 to Goss shows such a system for recovering from oil storage tanks by treating the sludge with an aqueous cleaning solution of a non-ionic surfactant consisting of $C_8$ to $C_{12}$ alkyl-phenol-ethylene oxide adduct and some combination of castor oil-ethylene oxide adduct and $C_8$ to $C_{12}$ aliphatic ethylene oxide adduct. Then a diluent such as diesel or light oil is added to the tank to recover the hydrocarbon. Upon heating the tank, hydrocarbon from sludge rises through the cleaning solution and enters the diluent. The hydrocarbon loaded diluent is removed and sent to a crude unit. The water layer is removed to a separator. Residual solids are removed by a vacuum truck. The gross products fall into three categories as the recovered hydrocarbon, the aqueous stream that perhaps can be treated in a waste water plant, and residual solids that are land-farmed. U.S. Pat. No. 5,762,719 to D'Muhala et al discloses cleaning petrochemical equipment and rail cars with a cleaning composition that is non-hazardous, biodegradable, later can be mused, and requires no steam. The composition is 20–50% terpene-based, 20–40% alkyl pyrrolidone, and 5–40% surfactant. After use, the cleaning composition is separated from the contaminant and reused. The specific protocol is spraying the contaminated object with the composition, rinsing the object with water, and separating the cleaning composition from the contaminant by heating. Cleaned contaminants include asphalt. U.S. Pat. No. 6,120,680 to Campbell suggests cleaning hydrocarbon sludges by demulsifying and liquefying them to allow separation into water, oils, and solids. The preferred demulsifier is an amine salt of dodecyl benzyl sulfonic acid (DDBSA). The preferred liquefiers are glycol ethers, polymerized glycol ethers, or polyalkylene glycols. The liquefaction of sludge with high asphaltene content is aided by addition of terpenes, especially citrene. The oil and water layers were recovered and disposed of. U.S. Pat. No. 6,168,708 to Burbridge et al discloses a cleaning method in which a hydrocarbon residue is added to a heated solvent to liquify it, after which the liquified residue is removed as hydrocarbon product. The solvent may be gas oil, diesel oil, stove oil, toluene, cyclohexane, naphtha, or xylene. Dirt and other solids accumulate in the solvent tank and are conventionally removed daring ordinary cleaning.

The practical problem resulting from all known solvent-based cleaning systems can be exemplified using data extracted from the Campbell patent, which appeared to be among the most conservative users of solvent. One of the examples mentions a 200,000 bbl storage tank that was cleaned of 25,000 bbl of sludge. The Campbell cleaning method increases this volume by solvents totalling 6%–7% of the sludge volume, which adds 1700 bbl, more or less, leading to a disposal volume on the order of 27,000 bbl of waste product per tank cleaning. From a time perspective, the tank cleaning required "only six days," which in absolute terms remains a very long time. The removed products had to be disposed of as oil field waste, adding an incredible volume to landfill and at an unreported cost that, nevertheless, is known to be a very high figure. Many of the tank cleaning technologies proportionately use substantially more solvent than reported by Campbell, and many use steam and water for parts of the cleaning, which greatly increases the waste volume directed to landfill. Unquestionably, the environmental and financial cost of such solvent cleaning systems is high. This cost is paid by the public, both in the detriment of ever expanding landfills, the monetary costs of maintaining a federally approved landfill, and in the overhead costs necessarily charged by the storage tank owner and passed-through to the public in the costs of petroleum products and generated energy.

The Campbell patent postulated that an extracted oil layer had suitable characteristics that it could have been sent to a refinery for processing. While this postulation might have theoretical merit, it is a practical fiction. No known refinery willingly will accept sludge or diluted sludge as an input stream. To do so would risk the refinery equipment. Refineries themselves do not reprocess even their own sludges or diluted sludges; and most certainly they will not process sludges from other sources. Removing sludges in dilute condition from petro-chemical equipment may produce conveniently clean equipment, but the environmental and financial costs remain high and are further increased by the addition of solvent volume and water volume to the sludge volume.

Automated equipment, specialized solvents, and limited degrees of reclamation have been developed, but it remains an environmentally necessary goal to achieve the substantially full recovery and recycling of cleaning solutions and petroleum products from all types of process vessels, storage tanks, and transportation vehicles.

In particular, prior art systems have too often sought to produce waste streams that merely were clean enough to be accepted into landfills and waste water systems. The product of various cleaning systems almost always must be disposed of, rather than redirected into commercial use.

A closed loop or substantially self-contained cleaning system is highly desirable in order to protect water supplies from contaminated wash liquids and protect landfill sites and other disposal sites from large volumes of contaminated water, contaminated solvents, sludges, and other byproducts of petro-chemical storage, transportation, and processing.

To achieve the foregoing and other objects and in accordance with the purpose of the present invention, as embodied and broadly described herein, the method and apparatus of this invention may comprise the following.

DISCLOSURE OF INVENTION

Against the described background, it is therefore a general object of the invention to provide an improved method for cleaning petroleum vessels and tanks, such as processing vessels, storage tanks, and railroad tank cars, while reclaiming substantially all solvents and cleaning compositions, as well as the hydrocarbons removed from the cleaned vessels and tanks.

A more specific object is to employ a closed loop pressure cleaning machine that applies a solvent to remove hydrocarbon residue, such as asphalt, and recovers both the residue and the solvent.

Additional objects, advantages and novel features of the invention shall be set forth in part in the description that follows, and in part will become apparent to those skilled in the art upon examination of the following or may be learned by the practice of the invention.

According to the invention, a closed loop cleaning process recovers hydrocarbon residue from a vessel in need of cleaning. The process steps include: First, treating a vessel in need of cleaning of hydrocarbon residue by liquefying at least a portion of the hydrocarbon residue with a terpene-based solvent, producing a mixture of spent solvent and hydrocarbon residue. Second, removing the mixture of spent solvent and hydrocarbon residue from the vessel. Third, rinsing the vessel with aqueous media, producing a spent aqueous media combined with a contaminant. Fourth, removing the spent aqueous media and contaminant from the vessel. Fifth, subsequent to said second step, returning to future service the spent solvent and hydrocarbon residue by the further steps of, sixth, separating the spent solvent of the mixture from the hydrocarbon residue by evaporating the spent solvent; seventh, condensing the evaporated solvent from said sixth step, producing a clean solvent suited for future service in treating a vessel in need of cleaning; and eighth, directing at least a portion of the hydrocarbon residue from said sixth step into a commercial product stream. Ninth, and subsequent to said fourth step, returning to future service the spent aqueous media by processing the spent aqueous media with a means for cleaning the contaminant from the spent aqueous media, producing a clean aqueous media.

The preferred solvent is d-terpene. The solvent is best applied in the cleaning process by spraying it under pressure. A suitable pressure is 200 psi. The spray is best applied by using an inserted rotatable spray head in the vessel, which rotates to distribute the spray.

The mixture of spent solvent and hydrocarbon residue can be treated by filtering the mixture to remove solids, producing at least a liquid hydrocarbon residue. The mixture also is treated by extracting the hydrocarbon residue into the spent solvent spent solvent. Such extraction can take place during pumping, agitation, and filtration of the mixture. Then the hydrocarbon residue is stratified step by allowing the mixture to rest in a tank. Solvent is cleaned and separated from hydrocarbon residue by processing it through a forced-circulation evaporator, where the solvent is distilled from the hydrocarbon residue. Further separation and recovery of clean solvent is by applying vacuum and heat to the mixture while processing the mixture through a rolling film evaporator. A liquified portion of hydrocarbon residue remains behind and typically can be redirected into commerce as bunker oil or asphalt.

The rinse water stream typically contains a contaminant such as a small amount of solvent. This solvent can be drawn off under vacuum while passing the water through a filter.

According to another aspect of the invention, a closed loop cleaning system is adapted to remove hydrocarbon residue from a vessel in need of such cleaning. A clean solvent reservoir contains a supply of terpene-based solvent suited to dissolve and liquify at least a portion of the hydrocarbon residue. A solvent applicator delivers the terpene-based solvent from the reservoir onto hydrocarbon residue in the vessel in need of such cleaning, liquefying at least a portion of the hydrocarbon residue into a mixture of solvent and hydrocarbon residue. A spent solvent reservoir receives the mixture of spent solvent and hydrocarbon residue from the vessel. Suitable pumps, conduits, or valves remove the mixture of solvent and hydrocarbon residue from the vessel and deliver it to the spent solvent reservoir. A clean aqueous media reservoir contains a supply of clean aqueous media suited to rinse the vessel subsequent to application of the solvent. Suitable pumps, conduits or valves apply the clean aqueous media to the vessel, such as through the same of different spray system as used to apply the solvent, producing spent aqueous media and a contaminant. A spent aqueous media reservoir receives the spent aqueous media from the vessel. Suitable conduits, pumps, or valves remove the spent aqueous media from the vessel and deliver it to the spent aqueous media reservoir. A suitable apparatus evaporates and recondenses spent solvent from the mixture of spent solvent and hydrocarbon residue to produce a separate recycled clean solvent and a separate recovered hydrocarbon residue. Suitable conduits, pumps or valves return the recycled clean solvent to the clean solvent reservoir. A suitable filter or other cleaning device removes the contaminant from the spent aqueous media to produce at least a recycled clean aqueous media. Suitable pumps, conduits or valves return the recycled clean aqueous media to the clean aqueous media reservoir. The recovered hydrocarbon residue it delivered into a stream of commerce.

The accompanying drawing, which is incorporated in and forms a part of the specification illustrates preferred embodiments of the present invention, and together with the description, serves to explain the principles of the invention. In the drawing:

BEST MODE FOR CARRYING OUT THE INVENTION

Figure 1:
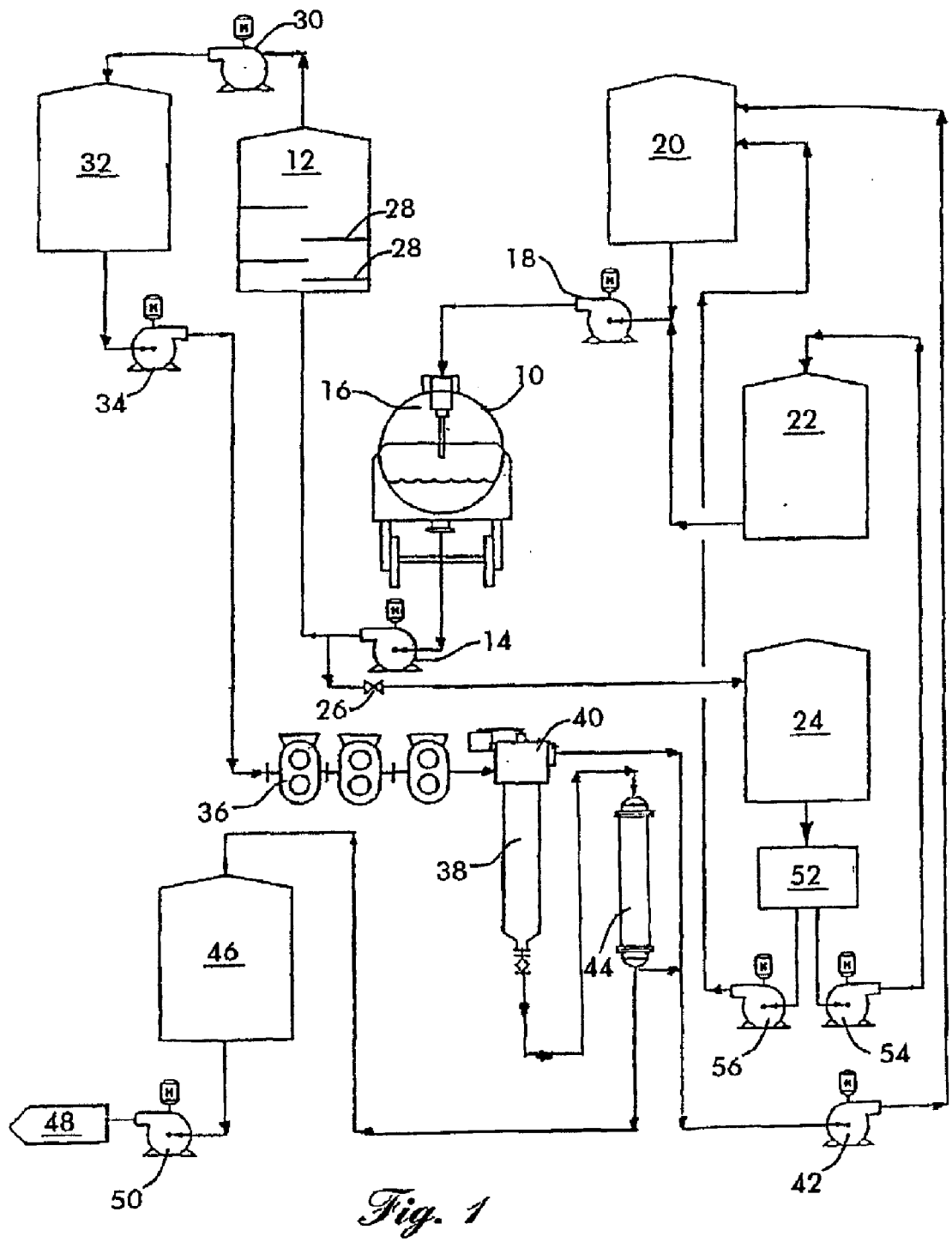
FIG. 1 is schematic diagram showing a process of cleaning petroleum products such as asphalt from a railroad tank car and recovering the asphalt residue and solvent.

The invention provides a rail car cleaning system and portable tank cleaning capabilities. The cleaning system uses a closed loop process and a recycling process that recovers the cleaning solution and separates it from the commodity cleaned. In addition, the invention employs a cleaning solution that is environmentally friendly and biodegradable. This cleaning process is revolutionary in the fact that tank entry is virtually nonexistent.

The process has been advanced by the use of a closed loop pressure cleaning machine designed expressly for the process of cleaning tanks and tank cars. The system is a non-entry system, which is new to the industry. The new solvent is a mixture of the menthadiene dipentene family chain. D-lirnonene is a preferred solvent. It is environmentally friendly and biodegradable. This solvent changes carbon 25 hydrocarbon to liquid at ambient temperature. The process is revolutionary in the fact that the solvent is recoverable and the hydrocarbon recovered in the cleaning process are saleable to the market, unlike the industry standard of introducing a cutter, i.e., diesel, gasoline, or as many times, 190 degree hot water. In introducing a cutter, you also increase your land fill 100% or more depending on the viscosity and amount of product in the tank.

The method is applied to the task of cleaning railroad tank cars or other petrochemical storage or processing equipment. Petroleum storage tanks of all descriptions are included, which may encompass the tanks of oil tanker ships, railroad tank cars, land-mounted tanks, petroleum transport trucks, and refinery vessels. Thus, although the process is described with reference to rail cars as the subject, such rail cars are examples and not limitations to the scope of the process.

Tank cars 10 in need of cleaning are brought together with a suitable array of processing equipment for performing the method. Often the convenient mode of transport is to bring a rail car 10 by rail to a central treatment site, which will be referred to as a cleaning rack. The rack may constitute a rail siding or spur at which fixed process equipment is installed. Alternatively, the process equipment can be mobile, for example mounted in a truck, rail car, or trailer, which can be brought to the location of the equipment or facility to be cleaned.

After the tank car and cleaning equipment have been brought together, each tank car is individually evaluated to determine the quantity and chemical nature both of its solid and liquid content. This evaluation allows selection of an appropriate solvent formula. There are numerous possible formulas for the solvent, each targeted for treating wastes ranging from light and refined oils such as kerosene and BETX (i.e. benzene, ethylbenzene, toluene, xylene), to heavy crude oils like bunker oil and asphalt. The single preferred solvent is d-limonene, which provides two valuable characteristics. First, it provides rapid and complete liquefaction of petroleum sludges. Second, according to the process steps constituting the invention, it is substantially entirely recoverable and reusable. Losses are nominal, such as 0.5% per cycle. Variations in solvent formula respond to specific conditions resulting from a particular petroleum product having been carried in the tank car. For example, waxy deposits are better removed when a surfactant such as a soap or detergent is added to the solvent.

If the tank car contains sufficient liquid content, then a desirable, although optional, first step in the active cleaning process is the removal of such liquid content by a suitable removal means to a mixing and filtering tank 12. For example, the liquid portion can be removed from the tank through a bottom drain and pumped into the mixing and filtering tank by a pump 14 through suitable conduits. The remaining sediments and sludge temporarily are left in the car.

After the step of removing liquid content, if any, the tank is solvent cleaned. This preferably is accomplished by robotic or automated spray means, which can be obtained from commercial sources or built to service a specific type of facility, such as a rail car. A spray head or array of spray nozzles 16 is positioned to direct its spray into the tank 10.

A rotatable array of nozzles 16 can be lowered into a tank, such as through a top man-way, by suitable mechanical positioning means for changing and adjusting the height of such array. Of course, it is possible to perform this step by other equipment, including manual insertion and manipulation of spray equipment. The preferred spray means 16 is one or more nozzles capable of spraying over 360 degrees. A combination of rotating the array and varying the height of the array in the tank allows the nozzles to treat substantially the entire interior surface of the tank.

The spray into the tank is preferred to be high pressure, so that the sprayed solvent dissolves the residues in the tank by both chemical solvation and mechanical application. An injection pump 18 receives the solvent from a suitable source, such as clean solvent tank 20, provides a high pressure source to supply solvent from the source to the spray nozzles. Suitable delivery conduits and valves direct the solvent to the pump and to the nozzles. The injection pump 18 provides the pressurized solvent to the 360-degree spray nozzles. For example, the solvent is introduced to the spray nozzles at 200 psi.

The solvent spray interacts with the sludge or other hydrocarbon in tank 10, liquefying the sludge. The solvent desirably is applied in a quantity sufficient to transform the sludge to the approximate viscosity of water. Gravity settles any sediment and the dissolved solvent and oil mixture to the bottom of the tank 10. From the bottom of the tank, the product consisting of the solvent, dissolved oils and sediments is readily removed through the bottom drain of the tank. Pump 14 directs the product to the mixing and filtering tank 12.

After the step of solvent cleaning the tank, the tank is given a final rinse with aqueous media such as clean water. A water source such as clean water tank 22 provides the wafer. Suitable delivery means such conduits and manual or automatically adjusted valves direct the water to the injection pump 18, while the supply of solvent to pump 18 is terminated. Injection pump 18 directs the water through the spray nozzles 16. The spent water drains by gravity to the bottom of the tank, together with typical contaminants acquired through the rinsing process. The contaminant likely includes a trace of solvent and may include other dirt or traces of hydrocarbon. The water and contaminants are removed through the bottom drain. Pump 14 forwards the rinse water through suitable conduits to a dirty water storage tank 24.

Valves and pumps can be used as required, according to the selected connections in the processing equipment. A valve 26 is shown by way of example in the conduit between pump 14 and tank 24, where such valve can control whether the product from pump 14 can enter tank 24. Similar valves or a system of valves can be used throughout the equipment of FIG. 1, such as between pump 18 and its alternate supply tanks and between pump 14 and its alternate target tanks. Such valves can preselect which source or target route is taken by the materials fed throughout the system, such as those fed to or removed from the tank car. Because the placement and use of such valves is routine and subject to the exact design and plumbing of the equipment, other valves are not shown. Similarly, the placement of tanks and reservoirs in some cases may allow transfers by gravity, while other placements may require a pump for an equivalent transfer. Accordingly, the placement of pumps is routine according to details of the equipment design.

It would be possible to create an equivalently functioning system by many alternate designs. For example, both tank 20 and tank 22 could be serviced by separate injection pumps. Similarly, separate discharge pumps could service tank 12 and tank 24. These individual pumps would be activated at appropriate times to perform the described process steps.

After the final rinse with water, the process of directly cleaning a tank 10 is complete. The inside walls and bottom of the tank car are found to be cleaned to the metal. The bottom contents have been dissolved and mixed with the solvent, after which they have been pumped into the mixing and filtering tank 12. The clean car is then returned to service, such as by pulling it from the rack, after having been out of service for approximately six hours.

The removal of sediment, hydrocarbon, and spent solvent from the railroad tank car is followed by a step of continuing the extraction of hydrocarbon from solids, which may be accompanied by a filtering step. During residence in tank 12, the solvent continues to extract the free and remaining hydrocarbon oil from the sediment. This extraction is further enabled and enhanced by agitating or circulating the tank contents. Preferably, the contents are directed over a series of metal filtering screens 28 placed intermittently throughout the tank. Pump 14 can be used to circulate the contents of tank 12 in order to aid the extraction. The solvent dissolves the hydrocarbons from the service of the solid sediments. However, the dissolving action of the solvent does not consume the hydrocarbon. Rather, the solvent solution mixes with the hydrocarbon and extracts the hydrocarbon from the sediments.

After the further extraction of hydrocarbon and filtering of larger solids, the materials in tank 12 are processed by a means for separating a substantial portion of the remaining solids from liquid. This separating means may be a period of continued residence time in tank 12 without substantial agitation or circulation. Such quiet residence allows the gravity separation of about 85% of the solid sediments. Other separating devices could be used, such as filters, centrifuges, and the like. However, the complexity and cost of such additional equipment is not necessary.

After the initial step of settling out solids, the solvent and hydrocarbon mixture is subjected to a separation step by stratification. The contents of tank 12 are transferred by a pump 30 to a filtered hydrocarbon and solvent tank 32. Residence time in tank 32 allows gravity again to stratify the solvent and hydrocarbon mixture without circulation. A pump 34 then transfers the mixture to a series of three vacuum bag filters 36.

The screened product is then processed by a recovery system employing a forced circulation evaporator 38, which is capable of recovering about 85% of the solvent. The forced circulation evaporator 38 distills the solvent from remaining hydrocarbon. The distilled solvent passes through an entrainment separator 40, where it is condensed. The product of this treatment is clean solvent which a pump 42 returns to clean solvent tank 20.

The remaining solvent and hydrocarbon are removed from the forced circulation evaporator and further processed through a rolling film evaporator 44 in which vacuum and heat are introduced, resulting in a 99.5% recovery rate of solvent. Pump 42 also directs this additional recovered solvent back to clean solvent tank 20 for reuse.

A semi-solid residue of remains after the solvent has been recovered. This residue consists of inorganics such as sand and metal. These residues are removed by screening devices in the entrainment separator 40 and by vacuum bag filters 36. The residue can be pumped back to tank 12 and combined with filtered solids in tank 12 for proper disposal. The volume of such solid residue is small.

A hydrocarbon fraction of the mixture is recovered from the rolling film evaporator 44. This fraction is removed and sent to a hydrocarbon saleable tank 46. The hydrocarbon product is in commercially useable condition and does not require processing through a refinery. It can be sold into a bunker or asphalt market, as signified by block 48 served by a product delivery pump 50. Block 48 can signify delivery into a stream of commerce, such as into a tanker truck, railroad tank car, pipeline, or other transportation and delivery system.

Rinse water previously was sent to tank 24. This spent water is cleaned of any contaminant by processing it through a ceramic separation unit 52, which may consist of ceramic filters. Four such filters, about 5 ft in length and 8 inches in diameter are suited to processes water from the dirty water storage tank 24.

The used water typically has minor traces of solvent, which is treated while in the separation unit 52. The water and solvent mixture is pulled by vacuum into the filters and proceeds through each of the four filters, resulting in a clean water product void of hydrocarbon. Such water meets requirements for discharge into most sewer system. However, the cleaned water need not be discharged. Preferably a pump 54 moves the cleaned water to clean water tank 22, where it is reused in subsequent cleanings. A pump 56 routes the remaining solvent from the separation unit 52 into tank 20 for further use.

The overall system is capable of cleaning a railroad tank car in a matter of hours rather than days. The terpene-based solvent is substantially entirely recovered and reused for subsequent cleanings. This choice of solvents is significant both because of its effectiveness for cleaning and for its recoverability for reuse, without degeneration in the recovery process. Rinse water is similarly recovered and reused. The only waste stream is the inorganic solids, which are so small in volume as to be inconsequential as compared to the landfill volume generated by substantially any other known tank cleaning system.

Due to the closed loop nature of the system, the various tanks and processing equipment can be assembled on a mobile platform such as a truck, trailer, or railroad car and brought to the site where a petroleum tank or other vessel is located. All of the solvents and rinse water return to such mobile tanks, thus eliminating the need to discharge any substantial discharge stream.

The forgoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention.

What is claimed is:

1. A closed loop cleaning process for removing hydrocarbon residue from a vessel in need of cleaning, comprising:

first, treating a vessel in need of cleaning of hydrocarbon residue by liquefying at least a portion of the hydrocarbon residue with a terpene-based solvent, producing a mixture of spent solvent and hydrocarbon residue;

second, removing the mixture of spent solvent and hydrocarbon residue from the vessel;

third, rinsing the vessel with aqueous media, producing a spent aqueous media combined with a contaminant;

fourth, removing the spent aqueous media and contaminant from the vessel;

fifth, subsequent to said second step, returning to future service the spent solvent and hydrocarbon residue by the further steps of:

sixth, separating the spent solvent of the mixture from the hydrocarbon residue by evaporating the spent solvent;

seventh, condensing the evaporated solvent from said sixth step, producing a clean solvent suited for future service in treating a vessel in need of cleaning; and eighth, directing at least a portion of the hydrocarbon residue from said sixth step into a commercial product stream;

ninth, subsequent to said fourth step, returning to future service the spent aqueous media by processing the spent-aqueous media with a means for cleaning the contaminant from the spent aqueous media, producing a clean aqueous media.

2. The closed loop cleaning process of claim 1, wherein said solvent is d-terpene.

3. The closed loop cleaning process of claim 1, wherein said first step is performed by spraying the solvent on the vessel under pressure.

4. The closed loop cleaning process of claim 3, wherein said first step is performed by spraying the solvent under a pressure of at least 200 psi.

5. The closed loop cleaning process of claim 3, wherein said first step is performed by inserting a rotatable spray head into the vessel; and spraying the solvent through the spray head while rotating the spray head to distribute the spray within the vessel.

6. The closed loop cleaning process of claim 1, wherein:

after said second step and prior to said sixth step the mixture of spent solvent and hydrocarbon residue is treated by a filtering step by directing the mixture through filtering means for removing solids from the mixture, producing at least a liquid hydrocarbon residue.

7. The closed loop cleaning process of claim 1, wherein:

after said second step and prior to said sixth step, the mixture of spent solvent and hydrocarbon residue is treated by an extraction step by contacting the hydrocarbon residue with the spent solvent and extracting hydrocarbon into the spent solvent.

8. The closed loop cleaning process of claim 1, wherein:

after said second step and prior to said sixth step, the mixture of spent solvent and hydrocarbon residue is treated by a stratification step by allowing the mixture to rest.

9. The closed loop cleaning process of claim 1, wherein:

said sixth step is performed by processing the mixture in a forced-circulation evaporator.

10. The closed loop cleaning process of claim 1, wherein:

said sixth step is performed by distilling the solvent from hydrocarbon residue.

11. The closed loop cleaning process of claim 10, wherein:

the solvent is distilled by processing the mixture through a forced circulation evaporator.

12. The closed loop cleaning process of claim 1, wherein:

said sixth step is performed by applying vacuum and heat to the mixture.

13. The closed loop cleaning process of claim 12, wherein:

vacuum and heat are applied to the mixture while processing the mixture through a rolling film evaporator.

14. The closed loop cleaning process of claim 1, wherein:
said eighth step is performed by directing at least a portion of the hydrocarbon residue from said sixth step into a bunker oil product stream.

15. The closed loop cleaning process of claim 1, wherein:
said eighth step is performed by directing at least a portion of the hydrocarbon residue from said sixth step into an asphalt product stream.

16. The closed loop cleaning process of claim 1, wherein:
said contaminant is at least partially solvent, and said ninth step is performed by drawing off solvent from the aqueous media by directing the aqueous media and contaminant under vacuum through a filter.

17. A closed loop cleaning system for removing hydrocarbon residue from a vessel in need of cleaning, comprising:

a clean solvent reservoir means for containing a supply of terpene-based solvent suited to dissolve and liquify at least a portion of the hydrocarbon residue;

a solvent application means for delivering terpene-based solvent from said reservoir onto hydrocarbon residue in the vessel in need of cleaning, liquefying at least a portion of the hydrocarbon residue into a mixture of solvent and hydrocarbon residue;

a spent solvent reservoir means for receiving the mixture of spent solvent and hydrocarbon residue from the vessel;

means for removing said mixture of solvent and hydrocarbon residue from the vessel and to said spent solvent reservoir means;

a clean aqueous media reservoir means for containing a supply of clean aqueous media suited to rinse the vessel subsequent to application of the solvent;

a means for applying said clean aqueous media to the vessel to produce spent aqueous media and a contaminant;

a spent aqueous media reservoir means for receiving the spent aqueous media from the vessel;

means for removing said spent aqueous media from the vessel and to said spent aqueous media reservoir means;

means for evaporating and recondensing spent solvent from said mixture of spent solvent and hydrocarbon residue to produce a separate recycled clean solvent and a separate recovered hydrocarbon residue;

means for returning said recycled clean solvent to said clean solvent reservoir means;

means for removing said contaminant from the spent aqueous media to produce at least a recycled clean aqueous media;

means for returning said recycled clean aqueous media to said clean aqueous reservoir means; and commercial delivering means for delivering said recovered hydrocarbon residue into stream of commerce.

* * * * *